United States Patent
Schutz et al.

(10) Patent No.: US 10,875,130 B2
(45) Date of Patent: Dec. 29, 2020

(54) SCRAP CUTTING APPARATUS WITH TRAVELING PROTECTIVE ENCLOSURE

(71) Applicant: TMS International Corporation, Pittsburgh, PA (US)

(72) Inventors: Timothy G Schutz, Grafton, OH (US); Joseph H. Jung, Mason, OH (US)

(73) Assignee: TMS International Corporation, Pittsburgh, PA (US)

( * ) Notice: Subject to any disclaimer, the term of this patent is extended or adjusted under 35 U.S.C. 154(b) by 0 days.

(21) Appl. No.: 16/307,249

(22) PCT Filed: Jun. 22, 2017

(86) PCT No.: PCT/US2017/038758
§ 371 (c)(1),
(2) Date: Dec. 5, 2018

(87) PCT Pub. No.: WO2017/223317
PCT Pub. Date: Dec. 28, 2017

(65) Prior Publication Data
US 2019/0291220 A1 Sep. 26, 2019

Related U.S. Application Data

(60) Provisional application No. 62/481,220, filed on Apr. 4, 2017, provisional application No. 62/354,293, filed on Jun. 24, 2016.

(51) Int. Cl.
*B23K 7/00* (2006.01)
*B23K 37/02* (2006.01)
*B23K 7/10* (2006.01)

(52) U.S. Cl.
CPC .......... *B23K 37/0229* (2013.01); *B23K 7/102* (2013.01)

(58) Field of Classification Search
CPC ...... B23K 37/0229; B23K 7/102; B23K 7/10; B23K 37/0294; B23K 37/006
See application file for complete search history.

(56) References Cited

U.S. PATENT DOCUMENTS

| 3,614,077 A | 10/1971 | Blackburn et al. |
| 3,700,222 A | 10/1972 | Baxter et al. |

(Continued)

FOREIGN PATENT DOCUMENTS

| DE | 2706014 A1 | 8/1978 |
| EP | 0051250 A1 | 5/1982 |
| JP | 58103962 A | 6/1983 |

OTHER PUBLICATIONS

A.L.B.A., "Special Scrap Torch Cutting Machines", http://www.albacut.com/en/machines/special-scrap-tcm.html [Sep. 23, 2015 10:54:11 AM], 3 pages.

(Continued)

*Primary Examiner* — Scott R Kastler
(74) *Attorney, Agent, or Firm* — The Webb Law Firm

(57) ABSTRACT

A scrap cutting apparatus including an enclosure comprising two open sides, two closed sides, an open bottom, and a closed top, wherein at least one opening is provided in at least one of closed sides, at least one torch extending through the at least one opening, and a rail system comprising two parallel rails, wherein the enclosure is adapted to move along the rail system. Also, a method of cutting metal scrap including positioning a plurality of pieces of scrap material between the rails of the scrap cutting apparatus described above, moving the enclosure over a first piece of scrap material, making at least one cut in the first piece of scrap material using the at least one torch, moving the enclosure along the rail system and over a second piece of (Continued)

scrap material, and making at least one cut in the second piece of scrap material using the torch.

18 Claims, 13 Drawing Sheets

(56) References Cited

U.S. PATENT DOCUMENTS

| | | | |
|---|---|---|---|
| 4,854,551 A | 8/1989 | Griebeler | |
| 5,280,883 A * | 1/1994 | Ibar | B08B 15/02 |
| | | | 266/49 |
| 6,060,679 A | 5/2000 | Ludwigson et al. | |
| 6,726,736 B2 * | 4/2004 | Koclejda | B01D 46/002 |
| | | | 15/347 |
| 7,407,621 B2 | 8/2008 | Keith | |
| 2008/0206038 A1 | 8/2008 | Keith | |
| 2019/0291220 A1 * | 9/2019 | Schutz | B23K 7/102 |

OTHER PUBLICATIONS

Framag, "Scrap Cutting Machines", http://www.framag.com/index.cfm?seite=schrottschneideanlagen&sprache=EN [Sep. 23, 2015 10:54:39 AM], 1 page.

TMS International, "Innovative Cutting Technology (ICT)", 2 pages, Glassport, PA.

* cited by examiner

SCRAP CUTTING APPARATUS WITH TRAVELING PROTECTIVE ENCLOSURE

CROSS REFERENCE TO RELATED APPLICATIONS

The present application is the United States national phase of International Application No. PCT/US2017/038758 filed Jun. 22, 2017, and claims priority to U.S. provisional patent application Ser. No. 62/354,293 filed Jun. 24, 2016 and U.S. provisional patent application Ser. No. 62/481,220, filed Apr. 4, 2017, the entire disclosures of which are herein incorporated by reference.

BACKGROUND OF THE INVENTION

Field of the Invention

The invention relates to a scrap cutting apparatus for cutting steel scrap utilizing a moveable protective enclosure.

Description of Related Art

Steel or other metal scrap in the form of coils, tundishes, and skulls may be cut by an operator using a hand torch or lance. When cutting steel coils in this manner, there is the potential for the coil, which is under tension, to spring open, potentially injuring the operator. Tundishes and skulls present a different kind of danger due to the size and weight of the tundish or skull. When cutting a tundish or skull, the piece being cut may be an odd shape that may fall towards the operator upon completion of the cut, again, potentially injuring the operator. There is also a concern with yield loss of the material being cut. Cutting such steel scrap with a hand torch or lance pipe creates a very wide "kerf" or cut in the scrap material which is waste or slag material. In addition, the wide "kerf" and the unsteady hand of the operator may increase unwanted smoke and/or fumes released into the atmosphere.

Stationary coil boxes 2 may be used when cutting scrap coils (FIG. 1). A coil 4 is blocked 6 or placed on a cradle to keep it from rolling. Then, a crane is used to place the coil box 2 over a scrap coil 4 that is to be cut. The coil box 2 generally has a horizontal opening 8 in one side through which an operator 10 places a hand-held torch 12 to cut the coil 4. The primary function of the coil box 2 is to protect the operator 10 from sparks, and more so, from the scrap coil 4 which is under tension and may spring open during cutting. Some scrap coils 4 are more dangerous than others, as some have a greater potential to violently spring open. Although this method has proven to be safer for the operator 10, it is slow and inefficient because only one scrap coil 4 may be placed in the coil box 2 at a time and after cutting, a crane is needed to remove the coil box 2 and the coil 4 before another scrap coil 4 may be placed in the coil box 2 and the process may be started again. This creates downtime in the process because no cutting is occurring while the next scrap coil 4 is being loaded into the coil box 2.

SUMMARY OF THE INVENTION

The present invention is directed to a scrap cutting apparatus that may cut more scrap material (tons, inches per minute, piece count, etc.) with a single machine operator while providing better ergonomics, improved safety for the operator, and less emissions released into the atmosphere, all while allowing the cutting process to be performed in a continuous manner. The scrap cutting apparatus allows for a continuous cutting operation that improves efficiency, better protects the operator, and prevents the spread of pollutants.

The present invention is directed to a scrap cutting apparatus comprising an enclosure comprising two open sides, two closed sides, an open bottom, and a closed top, wherein at least one opening is provided in at least one of closed sides, at least one torch extending through the at least one opening, and a rail system comprising two parallel rails, wherein the enclosure is adapted to move along the rail system. An opening may be provided in each of the closed sides of the enclosure and a torch may extend through each of the openings, such that two cuts can be made in the scrap material simultaneously.

The torch may be movable within the at least one opening in a direction extending from a first open side of the enclosure to a second open side of the enclosure, and, more specifically, the at least one torch may be movable along a track mounted on at least one of the open sides of the enclosure. The track may be movable in a direction extending from the open bottom of the enclosure to the closed top of the enclosure. A rod may be provided on the closed side of the enclosure at each end of the track and the track may be provided with an engagement portion that is movable along the rods. The track may be moved along the rods by cables which are attached to a cable winch.

The scrap cutting apparatus may further comprise a cradle system provided between the rails of the rail system and adapted to hold material that is to be cut by the scrap cutting apparatus. The cradle system may comprise two parallel rails. A first cradle system and a second cradle system may be provided, wherein the rails of the first cradle system are spaced apart from one another a first distance and the rails of the second cradle system are spaced apart from one another a second distance, the first distance being less than the second distance.

The scrap cutting apparatus may further comprise at least one opening in the closed top of the enclosure and at least one torch extending through the at least one opening in the closed top portion. The at least one torch extending through the at least one opening in the closed top of the enclosure may be movable in a direction extending from a first open side of the enclosure to a second open side of the enclosure, and, more specifically, the at least one torch extending through the at least one opening in the closed top of the enclosure may be movable along a track mounted on the closed top of the enclosure. An opening may be provided in each of the closed sides of the enclosure, an opening may be provided in the closed top of the enclosure, and a torch may extend through the openings, such that three cuts can be made in the scrap material simultaneously.

The scrap cutting apparatus may further comprise a bridge rail system comprising at least one beam spanning from an interior of the first closed side of the enclosure to an interior of the second closed side of the enclosure, a torch boom extending in a direction perpendicular to the beam, a torch buggy for moving the torch boom along the at least one beam, and at least one torch extending from the torch boom. The bridge rail system may further comprise at least one stabilizer beam.

The scrap cutting apparatus may further comprise a boom having a first and second end, where in the first end is attached to the enclosure, a torch boom extends from the second end of the boom in a direction perpendicular to the boom and parallel to the rails of the rail system, and at least one torch extends from the torch boom. The first end of the boom may be movable along the track in a direction extending from a first open side of the enclosure to a second open side of the enclosure such that the at least one torch on the torch boom is movable in a direction parallel to the rails of the rail system. The torch extending through the opening in the enclosure and the boom may be moved along the track simultaneously.

The present invention is further directed to a method of cutting scrap metal material comprising providing a scrap cutting apparatus as described above, positioning a plurality of pieces of scrap material in a linear fashion between the rails of the rail system of the scrap cutting apparatus, moving the enclosure over a first piece of scrap material, making at least one cut in the first piece of scrap material using the at least one torch, moving the enclosure along the rail system and over a second piece of scrap material, and making at least one cut in the second piece of scrap material using the torch.

DESCRIPTION OF THE INVENTION

Figure 1:
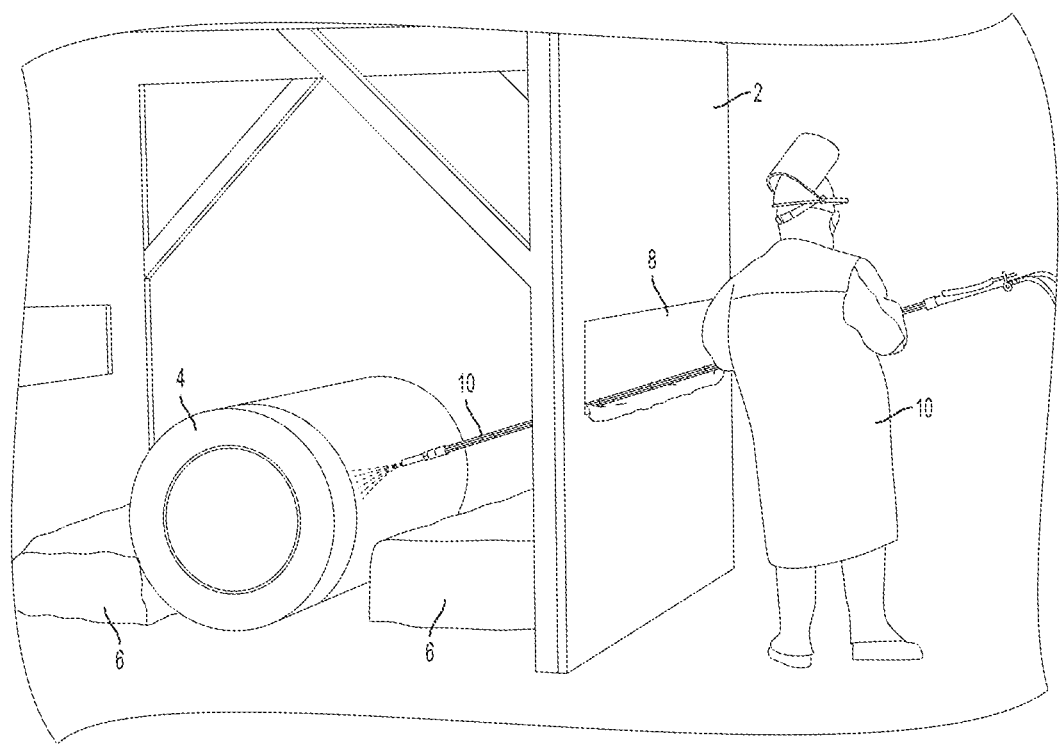
FIG. 1 is a front perspective view of a prior art stationary coil box.
Figure 2:
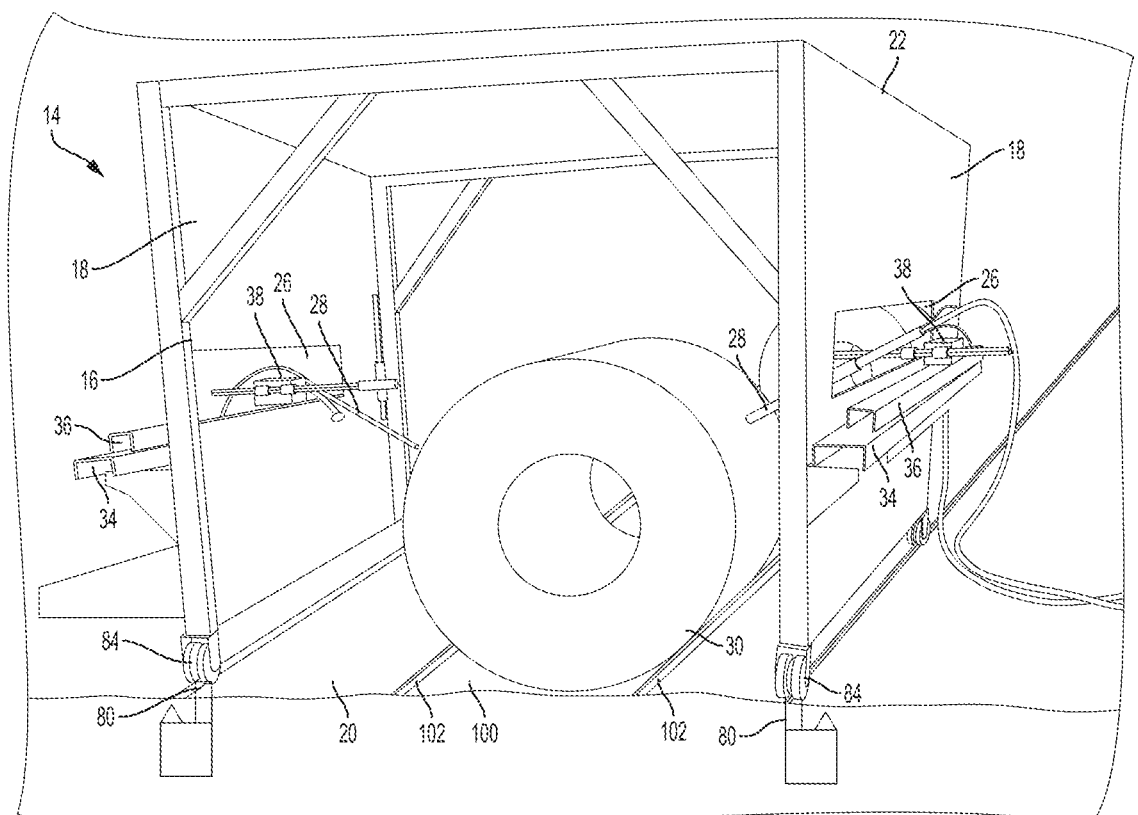
FIG. 2 is a front perspective view of a scrap cutting apparatus according to the present invention.

As used herein, unless otherwise expressly specified, all numbers such as those expressing values, ranges, amounts, or percentages may be read as if prefaced by the word "about", even if the term does not expressly appear. Any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1. Plural encompasses singular and vice versa. When ranges are given, any endpoints of those ranges and/or numbers within those ranges may be combined with the scope of the present invention. "Including", "such as", "for example", and like terms means "including/such as/for example but not limited to".

The present invention is directed to a scrap cutting apparatus for cutting steel or metal scrap material, such as coils, tundishes, and skulls, within a movable enclosure that reduces pollution and protects the operator. The scrap cutting apparatus may operate in a continuous manner and allow for at least one torch to be placed in multiple locations with respect to the enclosure.

The scrap cutting apparatus includes an enclosure 14. The enclosure has two open sides 16, two closed sides 18, an open bottom 20, and a closed top 22. The closed top 22 may include portions 24 that overhang the closed sides 18 of enclosure 14 and protect the operator 10 from rain or sun. At least one opening 26 is provided in at least one of closed sides 18 of the enclosure 14. Additional openings 26 may be provided in the closed sides 18 and/or the closed top 22 of the enclosure 14. For example, openings 26 may be provided in both closed sides 18 of the enclosure 14 and/or the closed top 22 of the enclosure 14.

Figure 3:
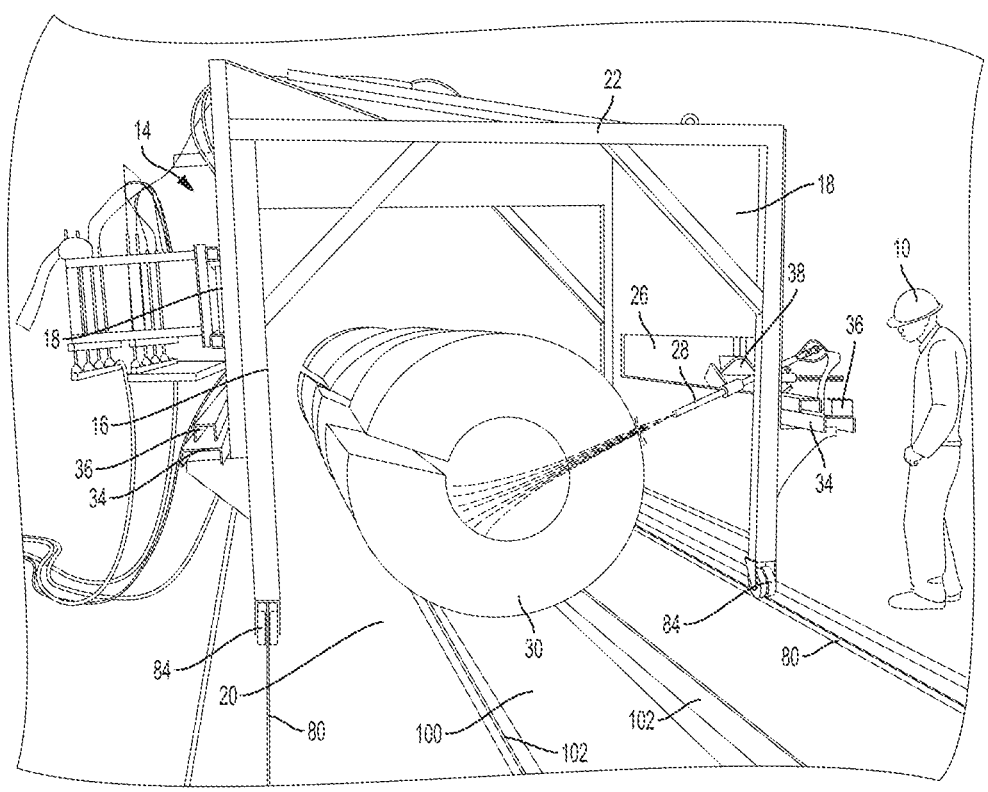
FIG. 3 is a front view of a scrap cutting apparatus according to the present invention showing a scrap coil being cut.
Figure 4:
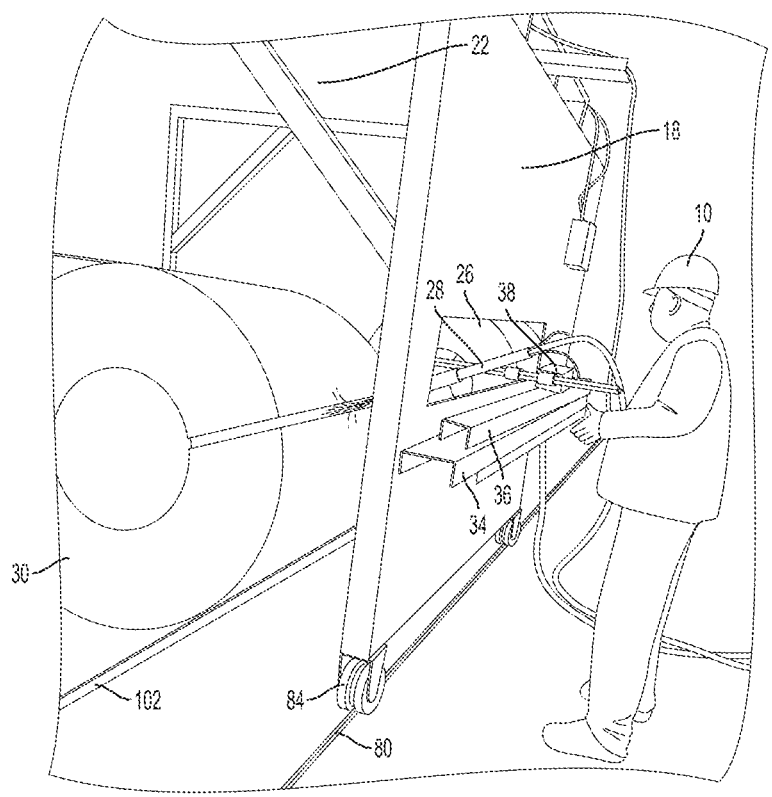
FIG. 4 is a side perspective view of a scrap cutting apparatus according to the present invention showing a first side of a scrap coil being cut.
Figure 5:
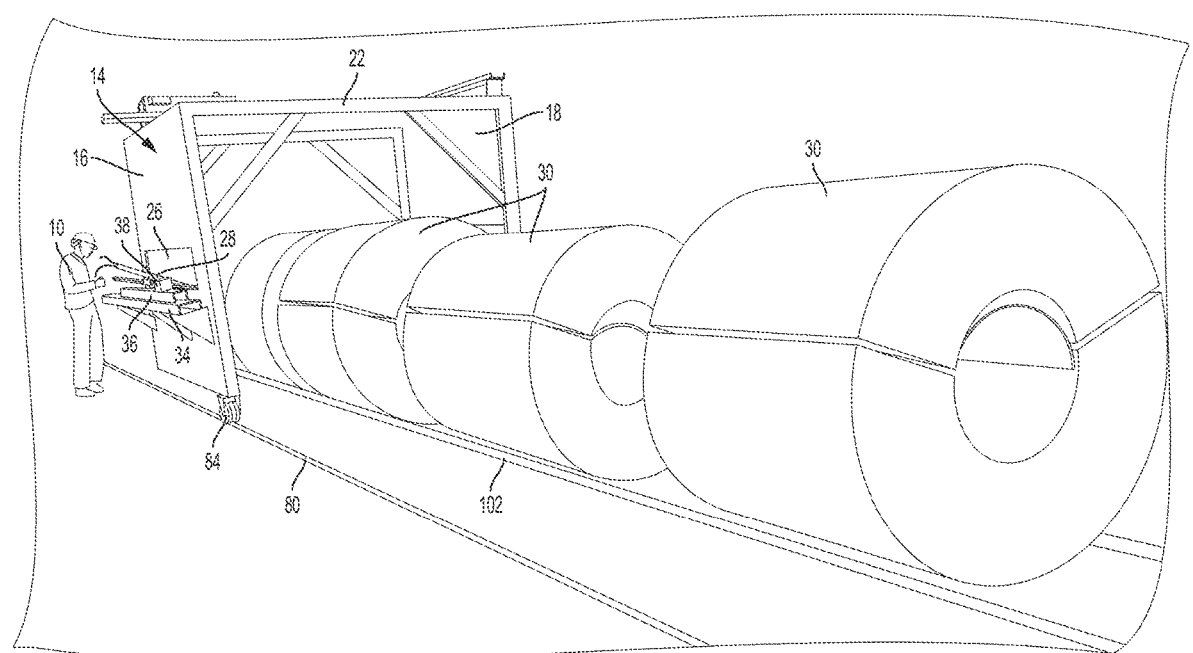
FIG. 5 is a side perspective view of a scrap cutting apparatus according to the present invention in which the enclosure has been moved along the rail line after cutting several scrap coils.

In one example (FIGS. 2-7), horizontal openings 26 are provided in both closed sides 18 of the enclosure 14. When a single torch 28 is provided, the operator 10 cuts one side of the scrap material 30 and then moves the torch 28 to the other side to cut the other side of the scrap material 30. In another example, each opening 26 is provided with a torch 28 (FIG. 3). With more than one horizontal opening 26, each provided with a torch 28, the operator 10 may cut both sides of the scrap material 30 at the same time. The torches 28 may be simultaneously operated by a single operator 10 using a multiple torch independent control remote panel. This further reduces the time necessary to cut steel coils, tundishes, or skulls by allowing two different areas of the scrap material 30 to be cut simultaneously.

Just below each opening 26, there is a horizontal shelf 34 with a track 36. A torch buggy 38 rides along track 36 in order to provide a linear cut in the scrap material 30. The torch buggy 38 may be moved manually along the track 36 by the operator 10 or may be accomplished using any suitable mechanism. Automated movement of the torch buggy 38 may be controlled by a single operator 10 using a control remote panel.

More than one opening 26 may be provided in one or both closed sides 18 of enclosure 14. For example, one or both closed sides 18 of the enclosure 14 may have an upper opening that is closer to the closed top 22 of the enclosure 14 and a lower opening that is closer to the open bottom 20 of the enclosure 14. The shelf 34 may be mounted adjacent to the upper opening and later be moved to be mounted adjacent to the lower opening or vice versa in order to accommodate different sizes of scrap material 30. If the scrap material 30 is shorter, the shelf 34 may be moved to the lower opening. If the scrap material 30 is taller, the shelf 34 may be moved to the upper opening. This ensures that the torch 28 cuts the scrap material 30 at the right attitude dependent on the desired size and shape of the cut material.

The horizontal shelf 34 may also be adapted for vertical movement with respect to the opening 26 using any suitable configuration. Such vertical movement allows the operator 10 to position the torch 28 higher or lower in relation to the scrap material 30 to allow scrap material 30 of different sizes to be cut. One example of a configuration for vertical movement of the shelf 34 is shown in FIGS. 6-9. Vertical posts 40 attached to the enclosure 14 may be provided at each end of the shelf 34 and linear bearings 42 that ride along the vertical posts 40 may be attached to each end of the shelf 34. A cable winch 44 having cables 46 connected to both ends of the shelf 34 may be used to move the shelf 34 vertically along the vertical posts 40. For example, the cables may be connected to each end of the track 36 using an eye bolt. The cable winch 44 may be mounted near the closed top 22 of the enclosure 14 and the cables 46 may be directed through a pulley system 50 to each end of the shelf 34. The cable winch 44 may be remote controlled and the controls may be located on the same remote control panel as the controls that control the torches 28 and the torch buggies 38. When the enclosure 14 includes openings 26 in both closed sides 18, the shelves 34 associated with the openings 26 may be vertically adjusted independently or in unison.

Figure 10:
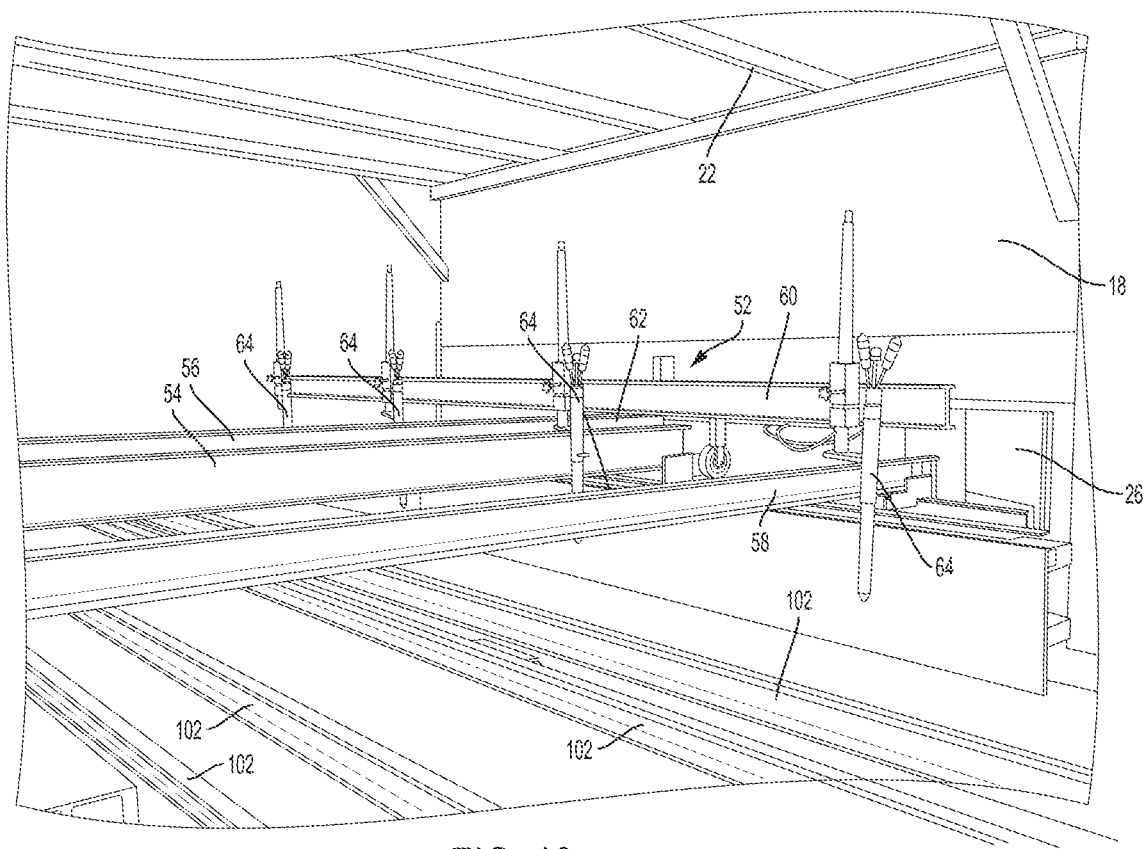
FIG. 10 is a front perspective view of a cross-cutting system according to the present invention.
Figure 11:
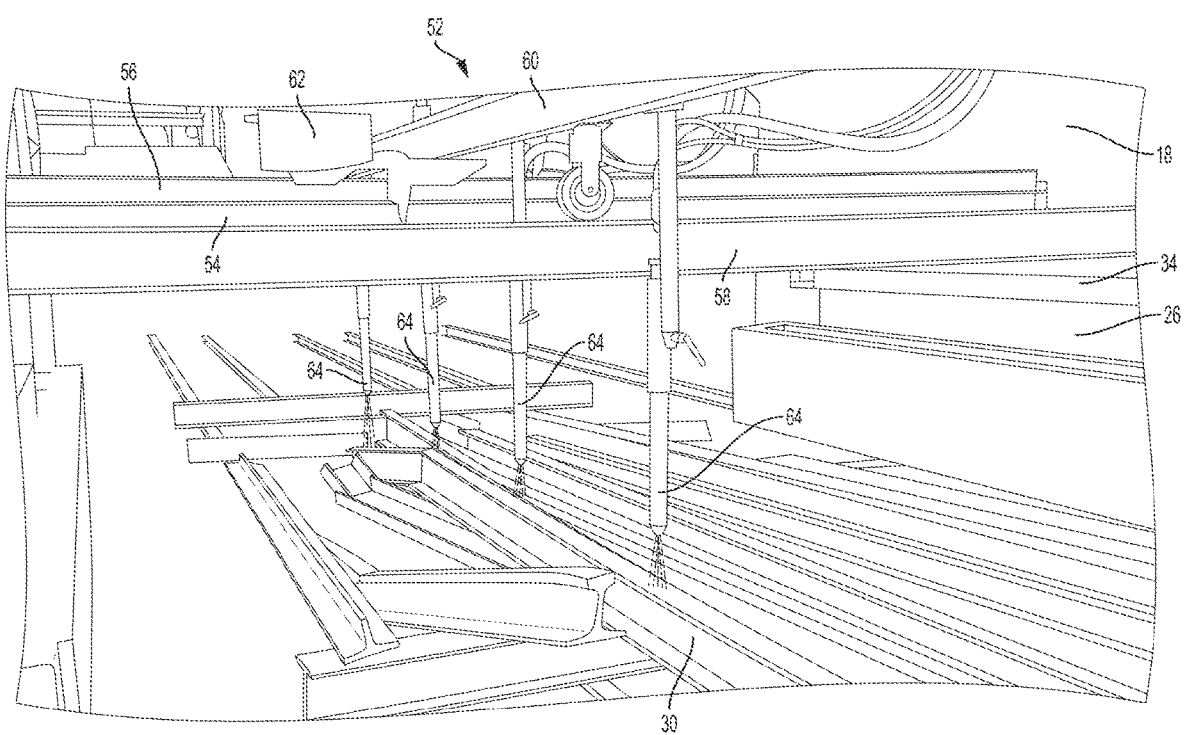
FIG. 11 is a front perspective view of the operation of a cross-cutting system according to the present invention.

In one embodiment, shown in FIGS. 10 and 11, a bridge rail system 52 may span across the inside of enclosure 14 from one closed side 18 of the enclosure 14 to the other closed side 18 of the enclosure 14. The bridge rail system 52 may comprise a center beam 54 including a track 56 and at least one outer stabilizer beam 58. The bridge rail system 52 passes through the openings 26 in the closed sides 18 of the enclosure 14 and rests on the track 36 provided on the shelves 34. A torch boom 60 extending perpendicular to the bridge rail system 52 is attached to a motorized boom buggy 62 that rides along the track 56 on the center beam 54. One or more torches 64 are provided spaced along the torch boom 60. This exemplary setup may be used for cross-cutting various scrap materials 30. The torch boom 60 may move along the center beam 54 across the enclosure 14 during the cutting operation to cut the scrap material 30. The bridge rail system 52 may also be moved vertically using the shelves 34 and the above-described vertical movement system, thereby allowing the operator to adjust the height of the torches 64 depending on the scrap material 30 that is being cut.

Figure 6:
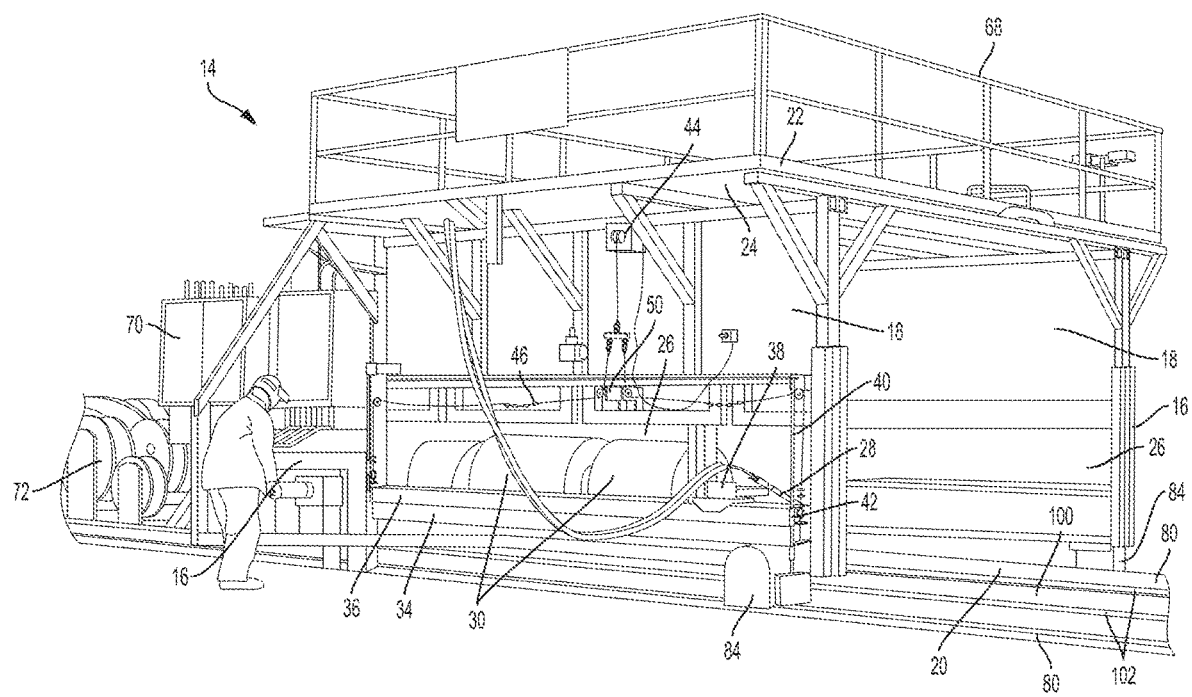
FIG. 6 is a side perspective view of a scrap cutting apparatus according to the present invention.
Figure 7:
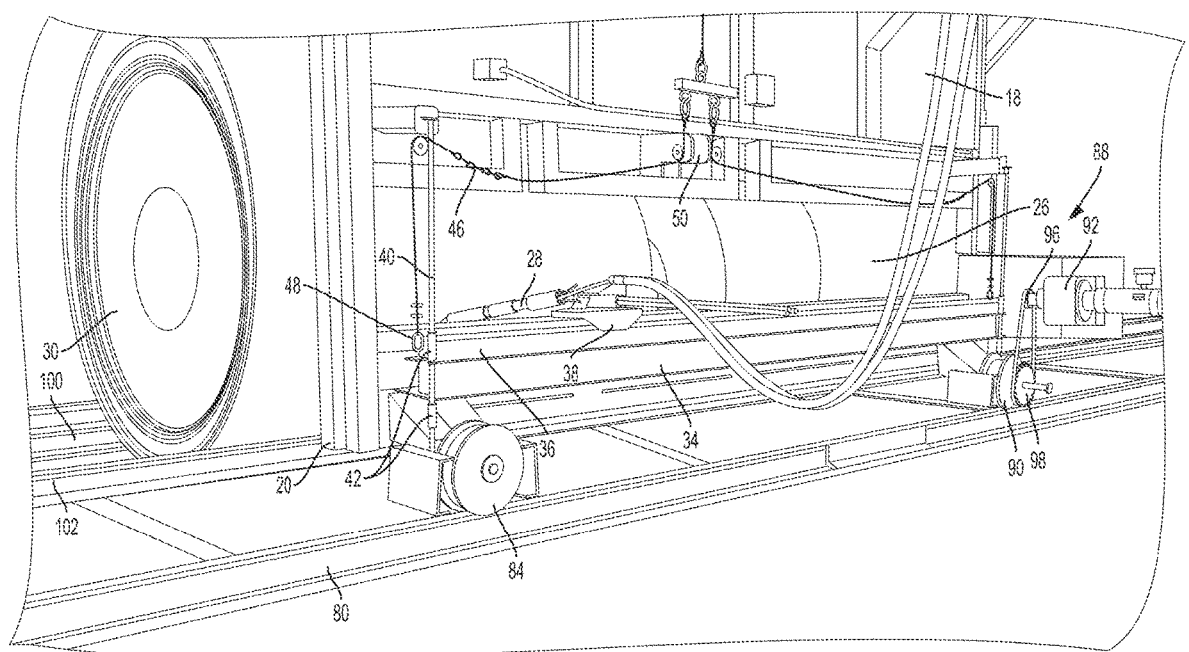
FIG. 7 is a side view of a scrap cutting apparatus according to the present invention showing the system for moving the torches in a vertical direction where the shelf and track are located at the bottom of the opening.
Figure 8:
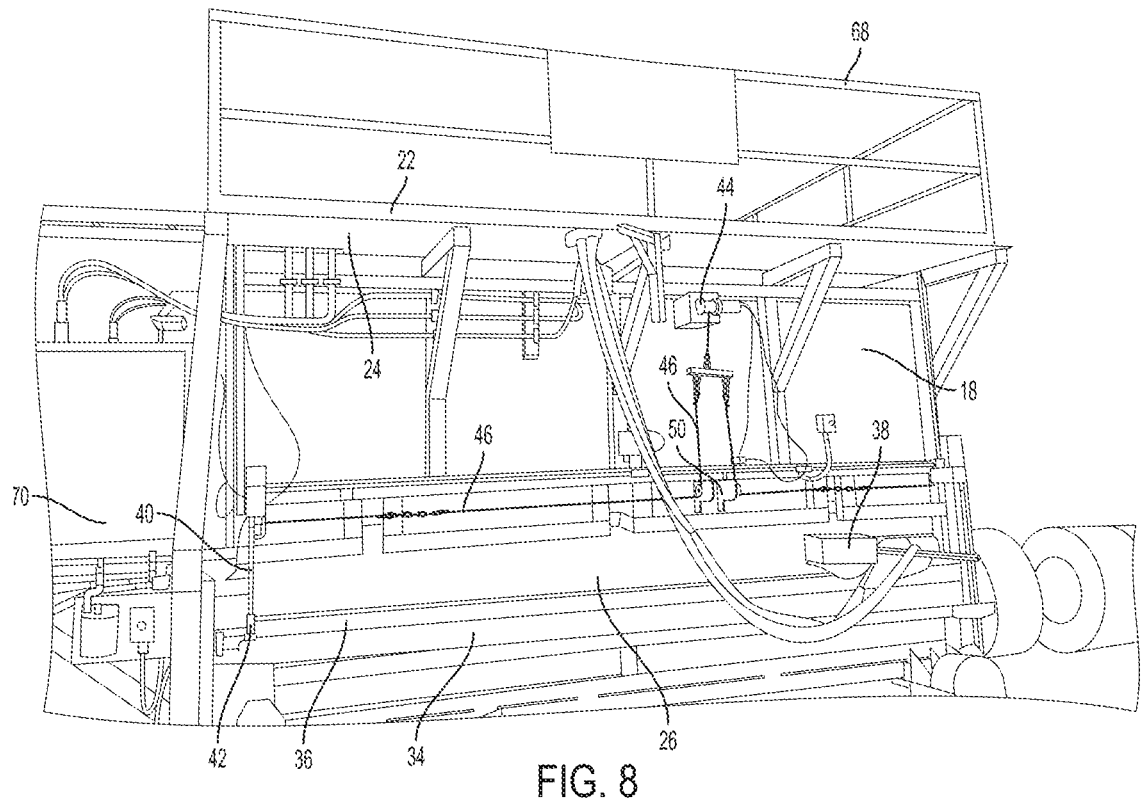
FIG. 8 is a side view of a scrap cutting apparatus according to the present invention showing the system for moving the torches in a vertical direction.
Figure 9:
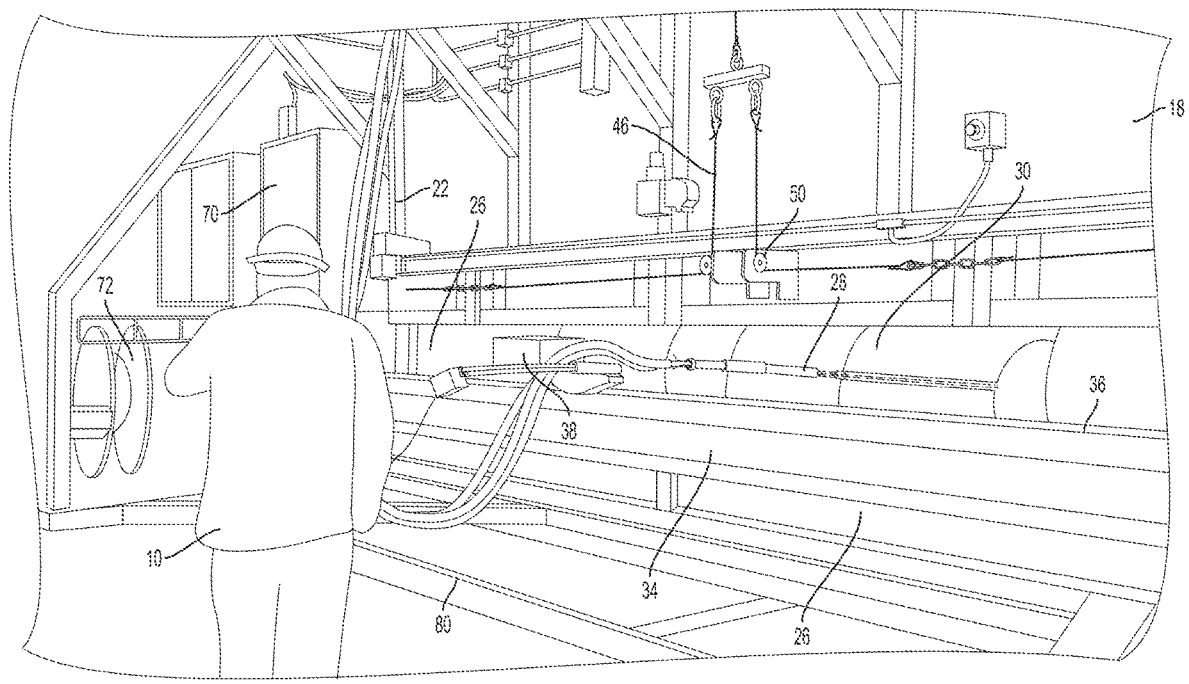
FIG. 9 is a side view photograph of a scrap cutting apparatus according to the present invention showing the system for moving the torches in a vertical direction where the shelf and track are located at the midpoint of the opening.

Similar to the openings 26, torches 28, torch buggies 38, and tracks 36 provided in the closed sides 18 of the enclosure 14, one or more openings 26 with associated torches 28, torch buggies 38, and tracks 36 may also be provided in the closed top 22 of the enclosure 14 to allow a linear cut to be made in the top of the scrap material 30. The openings 26 may extend in a longitudinal direction from one open side 16 of the enclosure 14 to the other open side 16 of the enclosure 14 or may extend in a transverse direction from one closed side 18 of the enclosure 14 to the other closed side 18 of the enclosure 14. An access ladder and a hand rail may be mounted to the enclosure 14 to allow operators access to the closed top 22 of the enclosure 14. A railing 68 may also be provided around the closed top 22 of the enclosure 14 to ensure that any operators working on the top of the enclosure 14 are protected from falling (FIG. 6).

The enclosure 14 may be equipped with a gas regulation station 70 to regulate the natural gas and oxygen flowing to torches 28. An appropriate gas regulation station may be provided based on the type of scrap material 30 to be cut, the type of torches 28 that are used, and the number of torches 28 that are used. Dual gas regulation stations 70 may also be used in certain circumstances. For example, one regulation station may be used for the coil cutting operation and another may be used for the multiple torch cross-cutting function.

Reels 72 that retract and expel hoses or lines that carry gases to the torches or power to the apparatus may be attached to at least one of the closed sides 18 of the enclosure 14. The reels 72 may be different colors to indicate whether the hoses or lines being controlled by the reel 72 supply a particular gas or power. Conduit may be placed on the outside of the closed side 18 of the enclosure 14 to transport the gas or power from the hoses or lines to the various mechanisms associated with the scrap cutting apparatus. This conduit provides a stable and secure method of transporting gas and power to the scrap cutting apparatus without the hoses or lines breaking or getting in the way of the operation of the apparatus.

In another example, hoses may lead from a gas regulation station 70 to the closed top 22 of the enclosure 14 to deliver gas to the torches 28 of the cross-cutting apparatus shown in FIGS. 10 and 11. The hoses may connect to the torches 28 of the cross cutting apparatus via openings in the closed top 22 of the enclosure 14.

The enclosure 14 travels on rails 80 along a rail line 82. The rail line 82 may be, for example, between 60' and 150' long. Wheels 84 mounted at the bottom of the closed sides 18 of the enclosure 14 ride on the rails 80 enabling the enclosure 14 to be moved in a linear manner along the rail line 82.

The enclosure 14 is moved along the rails 80 by any suitable means including, but not limited to, a cable winch system or a drive system 88 that drives one or more of the wheels 84. Such a drive system 88 may include drive wheels 90, a motor 92, and a chain linkage 94 connecting a gear 96 on the motor 92 to a gear 98 on the drive wheel 90. Such a drive system 88 removes the tripping hazard that may be associated with the cable of the cable winch system. Double flanged wheels 84 may be used to reduce the potential for derailment of enclosure 14.

Figure 12:
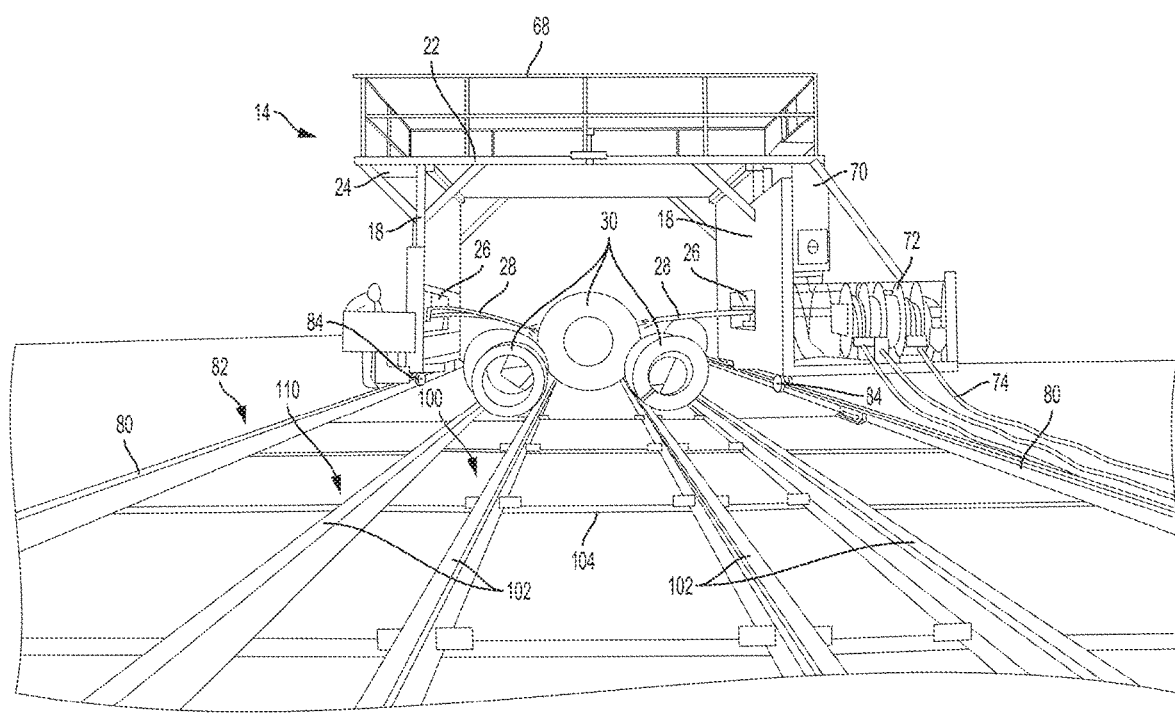
FIG. 12 is a front view of a scrap cutting apparatus showing the placement of different sized scrap material in a multi-rail cradle system according to the present invention.

A cradle system 100 for holding scrap material 30 before, after, and during cutting is provided between rails 80. The cradle system 100 may comprise at least two rails 102 that are placed between the rails 80 of the rail line 82 and extend along the rail line 82. The rails 102 of the cradle system 100 extend in an upward direction and provide barriers on opposing sides of the scrap material 30 that is to be cut keeping it from moving or rolling. As shown in FIG. 12, more than one set of rails 102 may be provided such that the distance between the first set of rails 102 is smaller than the distance between the second set of rails 102, thereby allowing coils of different sizes to be securely placed on the cradle system 100.

The foundation of the rail line 82 may be made from scrap slabs, caster trim, billets, or I-beams used as cross ties 104 laid perpendicular to desired longitudinal axis of the rail line 82. The cross ties 104 may be laid in a trench below the surface where the rail line 82 will be placed. The rails 80, which may be made of any suitable material including, but not limited to, angle iron, crane rails, or I-beams are welded to the cross ties 104. The cradle system 100, which may be made of any suitable material including, but not limited to, angle iron, caster trim, or other steel material, is located between the rails 80. Once the rail system has been assembled, the enclosure 14 is set on the rail line 82 to ensure proper alignment with rails 80. Then, concrete or slag is poured around the cross ties 104 to the point that cross ties 104 are no longer visible in order to lock the entire apparatus into position to ensure stability.

The operation of the scrap cutting apparatus will be described in relation to the cutting of scrap coils, however, it is to be understood that other configurations of scrap steel or metal may be cut in a similar manner. Scrap coils 30 are placed on the cradle system 100 in a line. The enclosure 14 is moved over the first coil and the coil is cut on at least one of a first side, a second side, and the top surface of the coil. After the first coil is cut, the enclosure 14 is moved over the second coil which is then cut, and so on in a continuous manner until all of the scrap coils 30 have been cut without having to wait on a crane to remove the enclosure 14 and/or replace the scrap coils 30.

Figure 13:
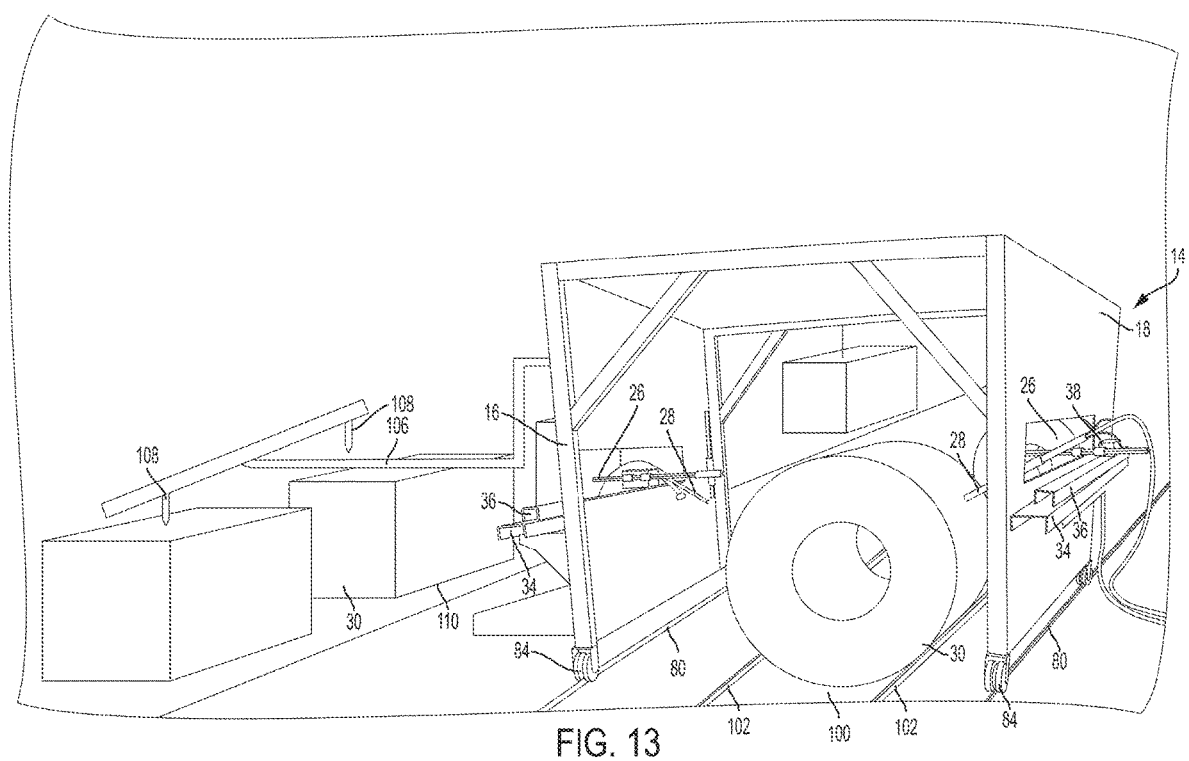
FIG. 13 is a perspective view of a scrap cutting apparatus according to the present invention that includes a boom for cutting scrap material outside of the enclosure.

The scrap cutting apparatus may further include a boom 106 having a torch 108 that extends from a closed side 18 or the closed top 22 of the enclosure 14 (FIG. 13). Scrap material 30, such as tundishes or skulls, may be placed parallel to the rail line 82 either on tables, cradles, or on the ground and cut using the torch 108 on the boom 106. Consecutive pieces of scrap material 30 may be cut continuously as the enclosure 14 and the boom 106 are moved along rail line 82. In one embodiment, the boom 106 may be connected to the track 36 on the horizontal shelf 34 on the closed side 18 of the enclosure 14 such that the boom 106 may be moved both horizontally and vertically to cut the scrap material 30 without moving the enclosure. In one example, a second cradle system 110 may be placed outside of and parallel to the rail line 82 and scrap material 30 to be cut by boom 106 may be placed on this second cradle system 110. This second cradle system 110 may be of a similar length to rail line 82 so that the boom 106 may cut a series of scrap material 30 outside of enclosure 14 with the same efficiency that scrap material 30 within enclosure 14 is being cut. In one example, scrap material 30 within the enclosure 14 may be cut at the same time as the boom 106 cuts other scrap material 30 placed outside of enclosure 14 on the second cradle system 110. Scrap coils may be cut inside of enclosure 14 while skulls and tundishes may be cut inside or outside of enclosure 14.

The process of placing numerous pieces of scrap material in a line with a fork lift or other desired means, then cutting scrap material continuously one after the other within the enclosure allows the operator to cut up to 250 tons in eight hours without waiting on a crane or other moving equipment to move the enclosure and/or the scrap material. This may be more than twice the tons per hour of traditional means and safer for the operator, as the operator may be protected from the cut scrap as well as sparks and heat from the cutting process. The scrap cutting apparatus may also include a fume extraction hood and duct to connect a bag house to the enclosure 14 if necessary, based on the type of scrap material that is being cut. Furthermore, the scrap cutting apparatus is designed to cut various kinds of scrap materials including coils, tundishes, and ladle skulls all on the same machine with one or multiple torches at the same time.

The scrap cutting apparatus allows for continuous cutting of scrap material while still protecting the operator from hazards associated with traditional coil and tundish cutting methods. A multiple torch design with the disclosed cutting bed layout allows a single operator to continuously cut one or multiple pieces of scrap material at the same time multiplying operator output compared to conventional hand torch methods.

The design of the scrap cutting apparatus makes cutting scrap material safer for the operator who operates the scrap cutting apparatus from a remote location away from the cutting flames and sparks. If used properly, the scrap cutting apparatus also reduces the risk of cut material falling on the operator's foot or other parts of the body. In addition, the construction of the scrap cutting apparatus eliminates the need for the operator to carry heavy torch equipment, buggies, and/or hoses from one piece of scrap material to another, reducing the risk of muscle strain.

Constant torch buggy speed and post mix flame configuration along with a proper oxy-fuel mixture produce considerably less smoke emissions over hand held torches or lance pipe processes. This feature may be key to helping the operator stay within air permit guidelines without expensive fume extraction systems.

It is to be understood that the invention may assume various alternative variations and sequences, except where expressly specified to the contrary. It is also to be understood that the specific devices and processes illustrated in the attached drawings, and described in the specification, are exemplary in nature. Hence, specific dimensions and other physical characteristics related to the examples disclosed herein are not to be considered as limiting.

The invention claimed is:

1. A scrap cutting apparatus comprising:
an enclosure comprising two open sides, two closed sides, an open bottom, and a closed top;
at least one opening in at least one of closed sides;
at least one torch extending through the at least one opening; and
a rail system comprising two parallel rails,
wherein the enclosure is adapted to move along the rail system, the at least one torch is movable within the at least one opening in a direction extending from a first open side of the enclosure to a second open side of the enclosure and the at least one torch is movable along a track mounted on at least one of the closed sides of the enclosure.

2. The scrap cutting apparatus of claim 1, wherein the track is movable in a direction extending from the open bottom of the enclosure to the closed top of the enclosure.

3. The scrap cutting apparatus of claim 2, wherein a rod is provided on the closed side of the enclosure at each end of the track and the track is provided with an engagement portion that is movable along the rods.

4. The scrap cutting apparatus of claim 3, wherein the track is moved along the rods by cables which are attached to a cable winch.

5. The scrap cutting apparatus of claim 1, further comprising a cradle system provided between the rails of the rail system and adapted to hold material that is to be cut by the scrap cutting apparatus.

6. The scrap cutting apparatus of claim 5, wherein the cradle system comprises two parallel rails.

7. The scrap cutting apparatus of claim 6, further comprising a first cradle system and a second cradle system, wherein the rails of the first cradle system are spaced apart from one another a first distance and the rails of the second cradle system are spaced apart from one another a second distance, the first distance being less than the second distance.

8. The scrap cutting apparatus of claim 1, wherein an opening is provided in each of the closed sides of the enclosure and a torch extends through each of the opening, wherein two cuts can be made in the scrap material simultaneously.

9. The scrap cutting apparatus of claim 1, further comprising at least one opening in the closed top of the enclosure and at least one torch extending through the at least one opening in the closed top portion.

10. The scrap cutting apparatus of claim 9, wherein the at least one torch extending through the at least one opening in the closed top of the enclosure is movable in a direction extending from a first open side of the enclosure to a second open side of the enclosure.

11. The scrap cutting apparatus of claim 10, wherein the at least one torch extending through the at least one opening in the closed top of the enclosure is movable along a track mounted on the closed top of the enclosure.

12. The scrap cutting apparatus of claim 8, further comprising an opening in the closed top of the enclosure and a torch extending through the opening in the closed top portion, wherein three cuts can be made in the scrap material simultaneously.

13. The scrap cutting apparatus of claim 1, further comprising a bridge rail system comprising:
   at least one beam spanning from an interior of the first closed side of the enclosure to an interior of the second closed side of the enclosure;
   a torch boom extending in a direction perpendicular to the beam;
   a torch buggy for moving the torch boom along the at least one beam; and
   at least one torch extending from the torch boom.

14. The scrap cutting apparatus of claim 13, wherein the bridge rail system further comprises at least one stabilizer beam.

15. The scrap cutting apparatus of claim 1, further comprising a boom having a first and second end, wherein the first end is attached to the enclosure, a torch boom extends from the second end of the boom in a direction perpendicular to the boom and parallel to the rails of the rail system, and at least one torch extends from the torch boom.

16. The scrap cutting apparatus of claim 15, wherein the first end of the boom is movable along the track in a direction extending from a first open side of the enclosure to a second open side of the enclosure such that the at least one torch on the torch boom is movable in a direction parallel to the rails of the rail system.

17. The scrap cutting apparatus of claim 16, wherein the torch extending through the opening in the enclosure and the boom can be moved along the track simultaneously.

18. A method of cutting scrap metal material comprising:
   providing a scrap cutting apparatus according to claim 1;
   positioning a plurality of pieces of scrap material in a linear fashion between the rails of the rail system of the scrap cutting apparatus;
   moving the enclosure over a first piece of scrap material;
   making at least one cut in the first piece of scrap material using the at least one torch;
   moving the enclosure along the rail system and over a second piece of scrap material; and
   making at least one cut in the second piece of scrap material using the torch.

* * * * *